(12) United States Patent
LaCaze

(10) Patent No.: US 7,860,671 B1
(45) Date of Patent: Dec. 28, 2010

(54) HIGH PRECISION LIQUID LEVEL GAUGE SYSTEM

(75) Inventor: John Randel LaCaze, Owens Cross Roads, AL (US)

(73) Assignee: INX International Ink Co., Owens Cross Roads, AL (US)

( * ) Notice: Subject to any disclaimer, the term of this patent is extended or adjusted under 35 U.S.C. 154(b) by 88 days.

(21) Appl. No.: 12/333,785

(22) Filed: Dec. 12, 2008

(51) Int. Cl.
*G01F 23/00* (2006.01)
(52) U.S. Cl. .......................... 702/55; 73/317
(58) Field of Classification Search .................. 702/45, 702/50, 55, 100, 182; 73/305, 313, 314, 73/317
See application file for complete search history.

(56) References Cited

U.S. PATENT DOCUMENTS 6,089,086 A * 7/2000 Swindler et al. .............. 73/317

7,155,349 B1 * 12/2006 Souluer ....................... 702/55

* cited by examiner

*Primary Examiner*—John H Le
(74) *Attorney, Agent, or Firm*—George P. Kobler; Lanier Ford Shave & Payne, P.C.

(57) ABSTRACT

High resolution liquid level gauge includes a float member with a buoyant, free end, and an opposing end rotatably attached to an interior surface of a reservoir such that the float member is free to rotate about an axis of rotation. A single magnet defining a single magnetic field is attached to the pivoting end such that the magnetic field is centered on the axis of rotation and rotates with the float member. A magnetic rotary encoder chip configured to detect angular position of the magnetic field is positioned to be aligned with the axis of rotation on the exterior of the reservoir at a distance from the magnet to detect the magnetic field. The encoder is configured to provide a signal representative of the angle of the magnetic field. A computer processor determines the liquid level within the reservoir based upon the signal.

9 Claims, 1 Drawing Sheet

HIGH PRECISION LIQUID LEVEL GAUGE SYSTEM

BRIEF DESCRIPTION OF THE DRAWINGS

The high resolution liquid level gauge is described with reference to the accompanying drawings. In the drawings, like reference numbers indicate identical or functionally similar elements.

DETAILED DESCRIPTION

Figure 1:
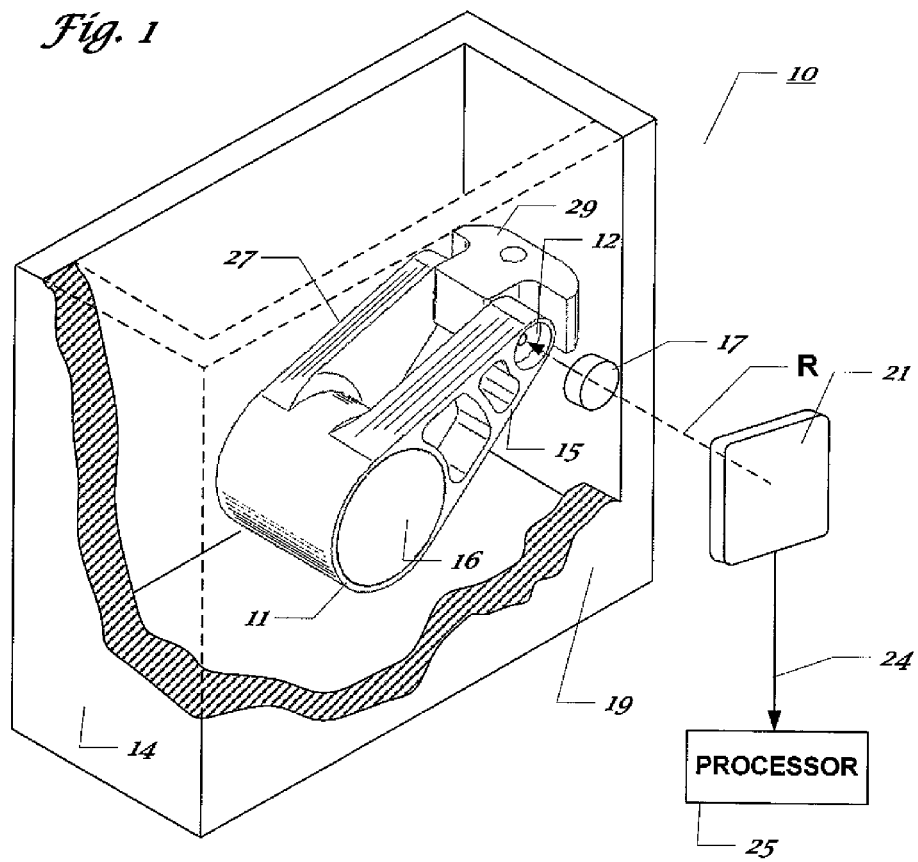
FIG. 1 illustrates an exemplary high resolution liquid level gauge.
Figure 2:
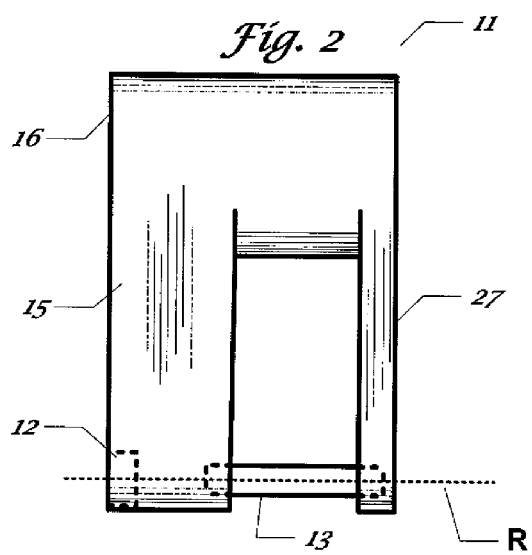
FIG. 2 is a top plan view of an exemplary float 11.
Figure 3:
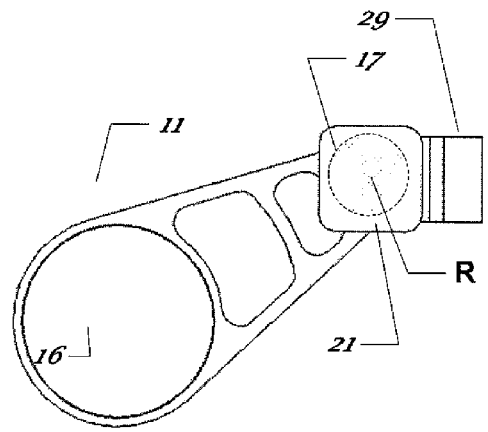
FIG. 3 is a side elevational view of a float 11 with an encoder chip 21 super-imposed over the axis of rotation R and the magnet 17.

The high resolution liquid level gauge and its advantages are best understood by referring to FIGS. 1 through 3 of the drawings. The elements of the drawings are not necessarily to scale, emphasis instead being placed upon clearly illustrating the principles of the invention. Throughout the drawings, like numerals are used for like and corresponding parts of the various drawings.

The high resolution liquid level gauge may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

FIG. 1 depicts an exemplary high resolution liquid level gauge system 10 which comprises a pivoting float 11 mounted to a wall within a reservoir 14. The float 11 is mounted to an axle 13, or pin, that defines an axis of rotation R about which the float 11 rotates. Preferably, float 11 is formed to have as little mechanical contact with the axle 13 as possible. Float 11 is formed with an arm 15 with an interior portion mounted to one end of the axle 13 and an outer portion within which is defined a cavity 12. Cavity 12 houses a single conventional two-pole magnet 17, and is defined in the arm such that center of the magnet 17 rests on the axis of rotation R when the magnet 17 is inserted in the cavity 12. Thus, the axis of rotation R for the float 11 is also the axis of rotation R for the magnet 17.

Float 11 is mounted in a fluid container so that magnet 17 is in close proximity to a reservoir 14 wall 19, shown in partial cut-away/dashed outline in FIG. 1. A magnetic encoder chip 21 is mounted in close proximity to the outer wall of the container, and aligned with the axis of rotation R. Magnetic encoder chip 21 is integrated chip incorporating a computer device configured with an array of Hall-effect sensors and a processor, and that is configured with computer-readable instructions, or control logic, which, when executed by the processor, obtains data from the array of sensors, determines the angle of the magnetic field of a magnet, and provides a signal 24 that represents the angle of the magnetic field. An example of such a chip is found in the AS5040 model rotary encoder chip available from AustriaMicrosystems AG, Tobelbaderstrasse 30, Schloss Premstaetten, A 8141, Unterpremstaetten, Austria. Those skilled in the art will recognize suitable substitutes may be used depending on the requirements of design.

The float 11 is formed with a buoyant, unattached, free end 16 that is allowed to rise or fall with the level of the fluid within the reservoir 14. Accordingly, because of the pivoting attachment of the arm 15 to the axle 13, as fluid level within the reservoir 14 changes, the free end 16 rises or falls. This causes the angle of the arm 15 to change about the axis of rotation. Consequently, the magnet 17 is also caused to rotate about the axis of rotation R, thereby changing the angle of the magnet's magnetic field.

The angle of the magnetic field is read by magnetic encoder chip 21 which then generates signal 24. The system 10 includes a control processor 25 responsive to chip 21 that receives the angle information signal 24. Processor 25 is configured with control logic which instructs the processor to calculate the height of the liquid in the reservoir 14 given the length the arm 15, and angle of the arm 15 as indicated by the angle of the magnetic field. One design limitation for the system 10 that should be considered is the field magnitude of the magnet 17, or its magnetization, as would be understood by those skilled in the art. If a magnet 17 with a relatively weak magnitude were used, the float 11 would need to be oriented within the reservoir 14 with the magnet 17 in close proximity to the reservoir interior surface, and the encoder chip 21 aligned with the axis of rotation on the outside surface of the reservoir 14 to be able to detect the magnetic field. For example, in a prototype, the magnets used were cylindrical, diametrically magnetized magnets dimensioned to be about 6.0 mm in diameter and about 2.5 mm in height exhibiting a magnetic field in the range of between about 45 mT and about 75 mT. The float 11 was attached, through the axle 13, to an interior surface of the reservoir 14, and the chip 21 was positioned near the exterior of the reservoir 14 so that the magnet 17 and chip were no more than about 2 mm apart. On the other hand, the greater the magnitude of the magnetic field, the greater the allowable distance between the position of the magnet and the position of the encoder chip may be for the gauge system to function, as would be understood by those skilled in the relevant arts with the benefit of reading this disclosure. Additionally, it will be appreciated that the embodiment described above may be altered such that the magnet and encoder chip combination may be in any location with respect to the reservoir.

Other limitations to be considered include that the materials out of which the float, the reservoir 14 and the axle 13 are made must be non-ferrous so as not to interfere with the magnetic field, and the fluid to be measured within the reservoir should not contain ferrous particles. Also, the choice of float 11 material is determined by buoyancy and chemical compatibility with the fluid to be measured. The design of the float 11 and axle 13 interface is important to minimize the possibility of the float 11 sticking. An optimal solution would minimize contact area between rotating components and maximize the inherent mechanical advantage of the float arm length, float mass and buoyancy. The length and angle of the float arm 15, 27 determine the resolution of the system 10 at a given angle. In general, the shorter the arm, the greater the angular resolution. With this in mind, arm length should be a function of the choice of the encoder chip 21 and the degree of angular resolution detectable. The encoder chip resolution and float arm length used in the prototype can detect fluid level changes as small as 0.006 inches.

It will be appreciated that the float 11 is described above referencing a single arm 15. However, as shown in the figures, float 11 may also be formed with an opposing arm 27, also with an interior portion mounted to an opposing end of axle 13. In this way, float is mounted to the axle 13 in order to allow the magnet 17 to rotate about the axis R without wobbling. It will be appreciated, however, that float 11 may be configured in a variety of ways to achieve a pure rotation, and so the float 11 structure should not be limited to that provided in the description above or in the drawings. Likewise, axle 13 is depicted in the figures as supported by an axle mount 29 which serves as an interface to secure the float 11 apparatus to the interior of the reservoir 14. The mount and the shape thereof depicted are only examples, and should not be considered to limit the gauge system 10.

The control processor 25 can be the same as the processor controlling the encoder chip 21, or it can be a separate device. The processor 25 can be implemented by a field programmable gated array (FPGA), a central processing unit (CPU) with a memory or other logic device. The term "processor" as used hereinabove, refers to a computer system. It is to be understood that such a computer system includes, for example, one or more processors that are connected to a communication bus. The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the system 10.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of system as described above.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described above will be apparent to persons skilled in the relevant arts. In yet another embodiment, features of the invention can be implemented using a combination of both hardware and software.

While particular embodiments of the high resolution liquid level gauge have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the apparatus described above.

What is claimed is:

1. High resolution liquid level gauge apparatus comprising:
   a float member with a buoyant, free end, and an opposing end rotatably attached to an interior surface of a reservoir such that said free end is free to move in the vertical plane rotate about an axis of rotation defined in the horizontal plane and perpendicular to said movement of said free end through said attached end;
   a single magnet defining a single magnetic field and attached to said attached end such that said magnetic field is centered on said axis of rotation and rotates with said float member; and
   a Hall Effect magnetic rotary encoder chip aligned with said axis of rotation and positioned on the exterior of the reservoir at a distance from said magnet to detect said magnetic field, said rotary encoder configured to detect angular position of said magnetic field.

2. The apparatus of claim 1, wherein said encoder is configured to provide a signal representative of the angular position of said magnetic field, and further comprising a processor responsive to said signal, said processor configured to determine liquid level within the reservoir based upon said signal.

3. The apparatus of claim 1, wherein said magnet is a diametrically polarized disc magnet.

4. The apparatus of claim 1, wherein said magnetic field exhibits a magnitude of between about 45 mT and 75 mT.

5. The apparatus of claim 4, wherein said encoder is positioned such that the distance from said encoder and said magnet is no more than about 2 mm.

6. An apparatus comprising:
   a liquid reservoir having an interior wall and an exterior wall;
   a float member rotatably attached by one end thereof to said interior wall, said end defining an axis of rotation in the horizontal plane;
   a magnetic field source centered on said axis of rotation affixed to said end within said reservoir, such that rotation of said float member causes rotation of said magnetic field source;
   a Hall effect sensor positioned on the exterior of said reservoir adjacent said exterior wall for detecting the angle of a magnetic field generated by said magnetic field source centered on the axis of rotation;
   a computer device responsive to said sensor configured with control logic for causing said computer device to determine a level of liquid within said reservoir based upon the value of said angle.

7. The apparatus of claim 6, wherein said magnetic field source is a disc magnet.

8. The apparatus of claim 7, wherein said disc magnet that exhibits a magnetic field magnitude of between 45 mT and about 75 mT.

9. The apparatus of claim 6, wherein the distance between said magnetic field source and said sensor is not greater than about 2 mm.

* * * * *